United States Patent Office 3,244,531
Patented Apr. 5, 1966

3,244,531
PROCESS FOR PREPARING AN AROMATIZED
COFFEE CONCENTRATE
William P. Clinton, Munsey, and Esra Pitchon, Flushing, N.Y., assignors to General Foods Corporation, White Plains, N.Y., a corporation of Delaware
No Drawing. Filed Apr. 8, 1965, Ser. No. 446,738
3 Claims. (Cl. 99—71)

The present application is a continuation-in-part of Serial No. 304,670 filed August 26, 1963 (now abandoned) which was a continuation-in-part of Serial No. 135,125 filed August 31, 1961 (now abandoned).

This invention relates to a coffee aroma suitable for use with soluble coffee powder and to a method of producing the same.

Coffee concentrates, as heretofore prepared, have either lost, or there has been largely destroyed or damaged during the processing, certain of the volatile constituents of the coffee, leaving in the concentrate chiefly the non-volatile constituents of the coffee which are dissolved by, or dispersed in, the extracting medium.

The preparation of a coffee brew from the roasted coffee beans results in the extraction of two distinct types of constituents from the beans, which, for the purpose of describing the process of the present invention are classified as: (1) the water soluble, and/or water dispersible nonvolatile materials, and (2) the volatile constituents which include essential flavor elements of roasted coffee. The first class comprises the bulk of the concentrate while the second class contains a small quantity of flavor elements essential to product quality. Certain of the essential flavor elements are ordinarily lost, destroyed or damaged, in the prior art processes practiced for preparing coffee concentrates. However, it has also been found that certain constituents of the first class of non-volatile substances are somewhat susceptible to process damage and that extreme or prolonged processing conditions are detrimental to the quality of the final product. One of the advantages of the process of this invention is that it permits a relatively rapid treatment of the roasted coffee so as to eliminate, or reduce to a minimum, such susceptible process damage as was heretofore experienced in respect to both classes of materials.

U.S. Patent 2,562,206 to Nutting discloses a process for preparing a coffee concentrate containing the volatile flavor obtained by steam treatment of the coffee. In this process, the ground roasted coffee is treated with steam in an enclosed chamber or a steam jacketed container in which the coffee is supported upon a screen, and the steam is caused to pass through the coffee. The treatment causes a uniform addition of moisture to the ground coffee due to the condensation upon the coffee of water derived from the steam. The increase of the moisture content of the ground roasted coffee results in the development and liberation of the volatile constituents. The steaming of the roasted coffee according to Nutting, opens the cellular structure thereby facilitating the removal of the volatile constituents and permitting rapid extraction and rapid draining in the course of the subsequent extraction of the non-volatile constituents of the roasted coffee. As the steam continues to pass through the coffee, the volatile substances liberated are carried away with the steam. The steam containing the volatile constituents derived from the coffee is condensed and cooled. There is thus formed a distillate, or condensate, composed of volatile constituents of the coffee in water.

The prior art processes (typified by the teachings of Nutting) while producing desired coffee flavors, failed to provide such flavors in a high concentration. Furthermore, in following the processes of the prior art it has not been possible to extract all of the soluble solids remaining in the coffee after steaming.

It is an object of the present invention to prepare an improved coffee aroma flavor in a greater concentration than has heretofore been possible.

It is a further object of the present invention to improve the extractability of the soluble solids remaining in the coffee after the desirable aroma components have been removed therefrom.

It has now been discovered that the concentration of volatile steam distilled aromas can be increased by a process which comprises prewetting a charge of roasted and ground coffee with 1–10% water by weight of the entire coffee charge, said water being added to the upper ⅓ portion of coffee at a temperature of below 120° F. to increase the concentration of moisture in said ⅓ portion to between 4 and 40%; steaming said charge of coffee to release volatile aromas; condensing said volatile aromas; and extracting the dearomatized coffee solids.

The coffee can be wet either by addition of water to the upper portion of the coffee bed after the steam column is loaded or ⅔ of the coffee charge can be placed in the steaming column and a premoistened cap can be used to supply the upper ⅓ portion. Regardless of the manner of addition, the charge of coffee will have its original moisture content of between 1–9% increased by a 1–10% water addition, preferably 1–5%. This water addition will take place in the upper ⅓ portion of the coffee column and will increase the moisture concentration in said ⅓ portion from between 1–9% to 4–40%, preferably 4–15%. The concentration of moisture in the lower ⅔ portion need not be increased.

While it is possible in carrying out the prewetting step of the present invention to employ water at a temperature below about 120° F. and preferably 32° F. to 120° F., it is most preferred to employ water temperatures within the range of 50° to 80° F. to avoid degradation of the desirable aromatic constituents while at the same time obtaining an operation which is most feasible from an economic standpoint. While temperatures as low as 32° F. may be satisfactorily employed, considerably more heat must be injected into the system upon subsequent processing in order to obtain the desirable volatilization which occurs upon the introduction of steam.

The low temperature in the coffee column resulting from prewetting permits an increased concentration of aromatics in the condensate. The increased concentration is brought about by the aromatics being continuously refluxed on the cooled surfaces of the coffee particles as they pass through the bed of coffee. The cooled, prewet particles cause the aroma-bearing steam to condense on their surfaces while at the same time other aroma fractions contained within the coffee particles are vaporized due to the heat exchange which takes place. Such condensation and vaporization creates an evaporative cooling effect which effectively keeps the temperature in the column sufficiently low so as to avoid excessive degradation of both the coffee and the aromas.

It has further been discovered in carrying out the present invention that the prewetting of coffee serves a useful purpose in commercial processing when the coffee is introduced into the extraction columns. In commercial operation the column walls are normally quite hot as a result of processing of prior batches of coffee, and if coffee is placed in the hot column, the heat will degrade many of the desirable aromatics in the coffee and will prevent desirable condensation and revolatilization of the steam vapors containing the aromatics. It is highly desirable to have such condensation and revaporization take place within the column if a steam distilled aroma having optimum properties is to be obtained.

The following example sets forth a preferred embodiment of the invention.

*Example*

About 180 lbs. of roasted and ground coffee was introduced into a conventional coffee percolator approximately 15 feet in height and 10 inches in diameter. About 4 lbs. of water at 75° F. was added to the coffee at the top of the column. Steam at a pressure of 2–7 p.s.i.g. and a flow rate of about 100 lbs. per hour was introduced into the bottom of the percolator for 30 minutes and permitted to pass through the column while maintaining a pressure of 2–7 p.s.i.g. in the column. The vapors passing out of the column during the last 10 minutes of steaming were collected in a brine condenser at 35° F. under a carbon dioxide atmosphere. Twelve hundred centimeters of steam distilled aroma was obtained. Based upon chromatography data, the increase in concentration of steam distilled aroma was determined to be about a 20% increase over steam distilled aroma obtained from the same quantity of coffee which had not been treated according to the process of the present invention.

While the present invention has been described by means of a specific example, it is to be understood that the invention is not limited thereto, reference being had to the appended claims for a definition of the scope of the invention.

What is claimed is:

1. A process for increasing the concentration of volatile aromas during steam distillation which comprises pre-wetting the charge of roasted and ground coffee with 1–10% water by weight of the entire coffee charge, said water being added to the upper ⅓ portion of coffee at a temperature of below 120° F. to increase the concentration of moisture in said one-third portion to between 4 and 40%; steaming said charge of coffee to release and reflux volatile aromas; condensing said volatile aromas; and extracting the dearomatized coffee solids.

2. A process for preparing an improved coffee aroma flavor which comprises wetting the upper one-third portion of a charge of roasted and ground coffee with 1–5% water having a temperature of between 32° to 120° F. to increase the moisture content of said one-third portion to between 4–15%, passing steam through said charge of coffee to produce volatile vapors refluxing said vapors, condensing said vapors to thereby collect the desirable aromatic constituents and thereafter extracting soluble solids from said coffee.

3. A process for preparing an improved coffee aroma flavor which comprises adding 1–5% water at a temperature of between 50° to 80° F. to the upper one-third portion of a bed of roasted and ground coffee to increase the concentration of moisture in said one-third portion to about 4–15%, passing steam through said coffee to release vapors under reflux and rectification conditions, condensing the vapors passing out of the top of said bed of coffee to collect the desirable aromatic constituents and thereafter extracting soluble solids from said coffee.

References Cited by the Examiner

UNITED STATES PATENTS 2,432,759 12/1947 Heyman _____ 99—71
2,562,206 7/1951 Nutting _____ 99—71
3,132,947 5/1964 Mahlmann _____ 99—71

FOREIGN PATENTS 246,454 10/1926 Great Britain.
663,637 12/1951 Great Britain.

A. LOUIS MONACELL, *Primary Examiner.*

M. W. GREENSTEIN, *Assistant Examiner.*